United States Patent [19]

Bolt et al.

[11] Patent Number: 5,164,263
[45] Date of Patent: Nov. 17, 1992

[54] ALUMINUM NITRIDE FLAKES AND SPHERES

[75] Inventors: John D. Bolt, Landenberg, Pa.; Walter Mahler, Wilmington; Frederick N. Tebbe, Hockessin, both of Del.; Robert J. Young, Jr., Gibbstown, N.J.

[73] Assignee: E. I. Du Pont de Nemours & Co., Wilmington, Del.

[21] Appl. No.: 454,667

[22] Filed: Dec. 21, 1989

Related U.S. Application Data

[60] Division of Ser. No. 334,612, Apr. 7, 1989, Pat. No. 4,908,197, which is a continuation-in-part of Ser. No. 903,486, Sep. 4, 1986, abandoned.

[51] Int. Cl.$^5$ .................. B32B 5/16; C01B 21/072; C07F 5/06
[52] U.S. Cl. .................. 428/402; 23/293 R; 23/305 A; 423/412; 428/328; 428/698; 501/96; 501/153; 556/176
[58] Field of Search .......... 423/409, 411, 412; 556/176; 501/96, 153; 23/293 R, 305 A, 328; 428/402, 698

[56] References Cited

U.S. PATENT DOCUMENTS

| | | | |
|---|---|---|---|
| 2,839,378 | 6/1958 | McAdow | 428/402 |
| 3,234,038 | 2/1966 | Stephens et al. | 428/328 |
| 3,320,296 | 5/1967 | Fetter et al. | 556/176 |
| 3,591,400 | 7/1971 | Palmquist et al. | 428/328 |
| 3,790,407 | 2/1974 | Merten et al. | 428/328 |
| 3,922,475 | 11/1975 | Manasevit | 428/539 |
| 4,296,045 | 10/1981 | Cucinella et al. | 556/176 |
| 4,642,298 | 2/1987 | Kuramoto et al. | 501/96 |
| 4,666,873 | 5/1987 | Morris, Jr. et al. | 501/96 |
| 4,965,140 | 10/1990 | Sarin | 428/698 |

FOREIGN PATENT DOCUMENTS

| | | | |
|---|---|---|---|
| 13609 | 1/1984 | Japan | 423/344 |
| 13610 | 1/1984 | Japan | 501/96 |

Primary Examiner—Wayne Langel
Attorney, Agent, or Firm—William H. Hamby

[57] ABSTRACT

Methods are described for preparing aluminum nitride of controllable morphology for ceramic and heat conduction applications. The methods comprise forming spherical particles or flakes of an intermediate, RAlNH, followed by heating the spheres or flakes of RAlNH at elevated temperatures to produce high purity aluminum nitride of corresponding morphology. Spheres of RAlNH are formed by (i) freezing a suspension of RAlNH in a liquid medium and thawing, by (ii) aging the suspension, or by (iii) dissolving RAlNH in a liquid medium and precipitating it. Flakes are formed by freezing a suspension of RAlNH in a liquid medium and removing frozen medium from the frozen suspension.

9 Claims, No Drawings

ALUMINUM NITRIDE FLAKES AND SPHERES

CROSS-REFERENCE TO RELATED APPLICATION

This is a division of application Ser. No. 07/334,612, filed Apr. 7, 1989, U.S. Pat. No. 4,908,197, which is a continuation-in-part of Ser. No. 903,486, filed Sep. 4, 1986, now abandoned.

BACKGROUND OF THE INVENTION

Conversion of $(CH_3)_3Al$ and $NH_3$ to aluminum nitride is known: Bahr, FIAT, Rev. Ger. Sci., Inorg. Chem. II, 155 to 179 (1948). The reaction is as follows:

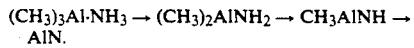

There is no teaching or suggestion that the $CH_3AlN$ intermediate was isolated or that the final reaction step was conducted in the presence of ammonia.

Laubengayer et al., J. Amer. Chem. Soc., 83, pages 542 to 546 (1961), disclose the reactions of amines at low temperatures with aluminum alkyls or alkyl aluminum chlorides to form 1:1 addition compounds. When such addition compounds having N—H and Al—R bonding are pyrolyzed, intermolecular condensation occurs, alkanes are evolved and aluminum-nitrogen polymeric products are formed. By control of the conditions of pyrolysis, the condensation results in a sequence of reactions producing amide aluminum polymers, imide aluminum polymers and, finally aluminum nitride.

Laubengayer et al., Inorg. Chem., 1, pages 632 to 637 (1962), disclose the reaction of triphenyl-aluminum and methylamine in toluene solution to form methylamine triphenylaluminum. This adduct loses benzene when heated in a vacuum and forms methylamido diphenylaluminum which in turn evolves benzene to form methylimidophenylaluminum. TriPhenylaluminum and dimethylamine react in toluene solution to form the dimethylamine triphenylaluminum complex which is heated to form dimethylamido diphenylaluminum.

Cohen et al., J. Chem. Soc., pages 1092 to 1096 (1965), disclose that ethylaluminum dichloride and diethylaluminum chloride form complexes with ammonia. There is no ammonolysis of aluminum-chlorine bonds. On heating, the complexes lose ethane and aluminum trichloride-ammonia, with the formation of aluminum-nitrogen polymers. They also disclose the reaction of $(C_2H_5)_3Al$ and $NH_3$, and conversion of the product to $C_2H_5AlNH$ which is described as polymeric and insoluble in organic solvents.

Interrante, in a meeting of the Materials Research Society, Apr., 1986, at Palo Alto, Calif., disclosed the conversion of $C_2H_5AlNH$ to aluminum nitride in the presence of ammonia. The aluminum nitride produced with ammonia contained less carbon than that formed without it. Interrante also disclosed that $C_2H_5AlNH$ is converted to aluminum nitride at 300° C. to 900° C. with retention of morphology.

SUMMARY OF THE INVENTION

This invention concerns a method for making aluminum nitride comprising:
(i) reacting $R_3Al$ and ammonia to produce RAlNH intermediate of irregular shape,
(ii) converting the irregularly shaped RAlNH to spheres or flakes in a liquid medium, and
(iii) heating the RAlNH spheres or flakes to form aluminum nitride of corresponding shape;
wherein R is selected from at least one member of the group $C_xH_{2x+1}$, where x is 1 to 20.

When making spheres, the method of this invention can be practiced by conducting (i) and (ii) in sequence or in a single step. In the method of this invention, a typical reaction sequence is as follows, wherein R is as previously defined:

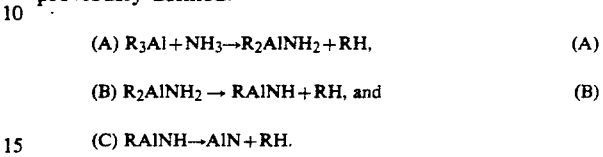

The solid RAlNH is converted to AlN with good retention of shape and size except for a small amount of shrinkage. Carbon associated with the AlN is greatly reduced by carrying out the reaction in the presence of a nitrogen-containing gas such as ammonia, hydrazine, or the like.

Under certain conditions, it is necessary to include ammonia containing some water in the step B preparation of spherical RAlNH intermediate. In that event, the intermediate RAlNH may contain $NH_2AlNH$. When converting the intermediate formed in step B to AlN, reactive materials such as air and moisture should be excluded because they may produce unwanted oxidized or hydrolyzed byproducts. Thus, step C should be conducted under vacuum or in the presence of an inert atmosphere at the very least. For even better results, i.e., improved purity, the step should be conducted in the presence of ammonia, hydrazine or similar nitrogen-containing compound. The RAlNH is a solid polymeric network which is converted to aluminum nitride upon heating Preferred conversion temperatures are about 800° to 1800° C. Lower or higher temperatures can be employed with corresponding adjustments in the temperature/time relationship.

This invention also concerns the conversion of RAlNH of irregular shape to spherical particles comprising:
(a) suspending the RAlNH in a liquid medium, and
(b) freezing, then thawing, the suspension of (a).

This invention also concerns conversion of irregularly shaped RAlNH to spherical particles by aging the RAlNH suspension of step (a) at temperatures above the melting point of the liquid medium and below the decomposition temperature of the liquid medium and RAlNH. The spherical particles produced by the freezing/thawing technique and/or the aging technique can then be isolated from the medium in which they were formed by any means that will effect their concentration Spheres can also be made by dissolving RAlNH in a liquid medium and precipitating it by removal of part of the liquid.

Preferred R moieties are $C_1$ to $C_4$ alkyl, most preferably $C_2$ alkyl. Preferred liquid media are methylene chloride, toluene, benzene, cyclohexane, methylcyclohexane and ammonia. The most preferred media are benzene, cyclohexane and ammonia (especially liquid or supercritical ammonia). Most preferred particle sizes are about 0.3 to 5.0 μm in diameter. Most preferred temperature for the formation of spherical particles of RAlNH is the melting point of the solvent up to about 200° C.

RAlNH of irregular shape can be converted to flakes by:
(a) suspending RAlNH in a liquid medium,
(b) freezing the suspension of (a), and
(c) removing a portion of the frozen medium from the frozen suspension of (b) to form flakes of RAlNH.

Spheres and flakes of RAlNH are converted to aluminum nitride of corresponding morphology by heat as discussed above in more detail.

Another aspect of this invention concerns aluminum nitride in the form of spheres and flakes. AlN in these shapes has utility in ceramic and electronic applications. Prior art methods for making AlN appear to be incapable of making AlN in the form of spheres and flakes The method of this invention, characterized as it is by the control of intermediate RAlNH morphology, insures that the aluminum nitride will have the corresponding shape. The prior art does not appear to be concerned with morphology of the intermediate and by the time AlN is made by prior art methods, morphology is not controllable because of the relative intractability of AlN.

This invention also concerns solutions and suspensions of RAlNH spheres and flakes, electronic devices incorporating AlN in the form of spheres and flakes and densified materials comprising AlN in compacted form and in ceramic compositions. Another aspect of this invention concerns devices that employ compacted forms of AlN spheres and flakes as well as devices that comprise mixtures of such spheres, flakes or compacted AlN with other materials.

DETAILS OF THE INVENTION

The intermediate made in Reaction B, RAlNH, is made by heating liquid $R_2AlNH_2$, at about 120° C. to 190° C. RAlNH forms as particles suspended in the liquid precursor. Removal of the unreacted $R_2AlNH_2$ and intermediates to RAlNH by washing with, say, cyclohexane gives a product which is easily dispersed in cyclohexane. The solid in these suspensions consists of irregular particles (typically about 0.35 μm). When solvent is evaporated from these suspensions, the small irregular particles collect to large irregular particles of 100 μm to several mm in diameter. It is by the method(s) of this invention that the irregular particles in suspension are converted to spheres or flakes.

Compounds suitable for use as liquid media are those in which the intermediate is partially soluble and which do not react to produce undesirable byproducts. Contemplated media include the following:
hydrocarbons, $C_xH_{2x+2}$, where x is 5 to 12;
cyclic hydrocarbons, $C_xH_{2x}$, where x is 5 to 12;
substituted cyclic compounds, $R_nC_xH_{2x-n}$, where R is $C_yH_{2y+1}$, y is 1 to 20, x is 5 to 12 and n is 1 to 2x;
aromatic compounds, $R_nC_6H_{6-n}$ and $R_mC_{10}H_{8-m}$, where R is $C_yH_{2y+1}$, y is 1 to 20, n is 1 to 6, m is 0 to 8;
$C_xH_{2x+2-n}Cl_n$, where x is 1 to 20 and n is 1 to 2x+1;
and ammonia.

Flakes of RAlNH are formed when well-dispersed suspensions of the polymer in liquids are frozen and freeze-dried. Both spheres and flakes of RAlNH have been converted to aluminum nitride with retention of the corresponding spherical and flake-like morphology. Preferred spheres and flakes of this invention are those having densities substantially equivalent to the theoretical density of aluminum nitride.

Spheres provided by the method of this invention can be closely packed and sintered to coherent objects of high thermal conductivity. Flakes of RAlNH can be converted to flake-like AlN which, when incorporated in a polymeric or ceramic substrate, promote conduction of heat therethrough. The spheres and flakes of aluminum nitride can be utilized to make ceramic and electronic devices. Spherical powder is pressed into the shape of an object suitable for use as a support or substrate for electronic devices, and is sintered to a ceramic of high density and high thermal conductivity. Flakes are mixed with an organic or inorganic material to form a composite and the composite can be formed into the shape of a tape or laminate to serve as a substrate of improved thermal conductivity for electronic devices. Materials contemplated for admixture with the AlN flakes include organic polymers, ceramic powders, ceramic precursors, glass, glass precursors, binders, and the like.

The invention is illustrated by the following Examples. The Procedure that precedes the Examples describes a typical method for reacting $R_3Al$ and ammonia in step (i) of the process of this invention. In Examples 1 to 5, an intermediate product from this step (i) reaction, $(C_2H_5)_2AlNH_2$, is reacted by the described method(s) to produce AlN spheres or flakes or RAlNH precursor which is converted to AlN spheres or flakes by heating at about 800° to 1800° C.

PROCEDURE

With the exclusion of air and moisture, triethylaluminum, 80 ml, is stirred in a 500 ml round-bottomed flask and treated with gaseous ammonia at about 24° C. to 65° C. An excess of ammonia is supplied to insure that the reaction proceeds to completion. The reaction mixture consists of $(C_2H_5)_2AlNH_2$ and ammonia. Excess ammonia is evaporated from the stirred mixture by warming it to 56° C. under a vacuum of about 0.1 torr. The product is $(C_2H_5)_2AlNH_2$.

EXAMPLE 1

Preparation of Flake $C_2H_5AlNH$ in Cyclohexane

A 15 mL (13.3 g) sample of $(C_2H_5)_2AlNH_2$ was warmed to 130° C. over 20 minutes and the temperature was maintained at 127° to 130° C. for 17 minutes. Hexane, 35 mL, was added at ambient temperature and, after centrifugation, solids were separated from the supernatant liquid. Using the technique of suspension and centrifugation, the solids were further washed with a 35 mL portion of hexane, and two 35 mL portions of cyclohexane. After removing a portion (4%) of the product for analysis, the remainder, suspended in 105 mL of cyclohexane was frozen. Cyclohexane was evaporated from the solid under vacuum. A white solid, 1.8 g, was isolated and found by scanning electron microscopy, to consist of flake-like objects of approximately 1 μm thickness, and length × width sizes of approximately 20×10 μm to 40×30 μm.

EXAMPLE 2

Preparation of Flake $C_2H_5AlNH$ in Benzene

A 15 mL (13.3g) sample of $(C_2H_5)_2AlNH_2$ was warmed to 130° C. over 20 minutes and the temperature was maintained at 127° to 130° C. for 17 minutes Hexane, 55 mL, was added at ambient temperature and, after centrifugation, solids were separated from the supernatant liquid. Using the technique of suspension and centrifugation, the solids were further washed with a 35 mL portion of hexane and two 35 mL portions of benzene. The solid $C_2H_5AlNH$ was suspended in 35 mL of benzene, and this suspension, contained within a round bottomed flask, was subjected to vacuum. As benzene evaporated, the suspension cooled to a temperature below its melting point. Evaporation of benzene from the solid was continued until the product, a solid, was dry. The product examined by the scanning electron microscope, was found to consist of flake-like objects of approximately 1 $\mu$m thickness, and length $\times$ width sizes of approximately $20 \times 10$ $\mu$m to $100 \times 80$ $\mu$m in diameter.

Preparation of Flake AlN

A 0.05g portion of the flake $C_2H_5AlNH$ obtained from the frozen benzene suspension was heated in a quartz tube under a stream of ammonia supplied at one atmosphere of pressure. The temperature of the tube was increased to 900° C. over 295 minutes and was then maintained at 900° C. for 60 minutes. The product was white AlN. The quantity of AlN recovered was 0.03g. Analysis by X-ray diffraction and scanning electron microscopy showed AlN flakes.

EXAMPLE 3

Preparation of Spherical Particles of $C_2H_5AlNH$ by Freezing/Thawing $(C_2H_5)_2AlNH_2$, 20.6 mL, was heated with stirring at 118° to 129° C. over 20 minutes to produce a viscous suspension of $C_2H_5AlNH$. The suspension was treated with cyclohexane and isolated by centrifugation and decantation of the liquid phase. This process of washing was repeated three times. Without drying, the solid was mixed with cyclohexane to produce a suspension estimated to contain 0.1% of solids. Examination of the suspension by the light scattering technique showed most particles to be 0.32 to 0.35 $\mu$m. Examination by transmission electron microscopy showed the solids to consist of platelets and collections of material in irregular shapes.

A suspension of the $C_2H_5AlNH$, containing about 1.2g of $C_2H_5AlNH$ in 7g of cyclohexane, was frozen at $-35°$ C., thawed and refrozen. After rethawing, a portion of the suspension was subjected to transmission electron microscopy which showed the solid present after evaporation of cyclohexane to consist of a mixture of spherical particles of about 0.03 $\mu$m to 1 $\mu$m, together with material of poorly defined morphology. This mixture can be converted to aluminum nitride with corresponding retention of spherical morphology by the procedure described in Example 2.

EXAMPLE 4

Preparation of Spherical

Particles of $C_2H_5AlNH$ by Aging $(C_2H_5)_2AlNH_2$, 20 mL, was placed in a round bottom flask and heated with stirring under an atmosphere of nitrogen. After 43 minutes at 124° to 136° C., the mixture consisted of a thick, cloudy suspension. An additional 5 mL of $(C_2H_5)_2AlNH_2$ was added, with the result that the viscosity of the mixture was reduced and heating near 132° C. was continued 4 minutes until the viscosity of the suspension again increased. The product mixture was treated with 10 mL of cyclohexane and centrifuged. After decantation of the supernatant, the residue was further washed three times with cyclohexane (30 mL) with centrifugal separation of solid and liquid phases. After the final wash, the solid was dried under vacuum. The yield was 1.8 g of solid $C_2H_5AlNH$.

A mixture of $C_2H_5AlNH$, 1.3 g, and cyclohexane, 26 mL, was boiled 1 hr. The resulting suspension was centrifuged at 18,000 rpm at 10° to 16° C. for 30 minutes at which time the supernatant was clear. Upon evaporation of solvent from the supernatant, 0.3g of $C_2H_5AlNH$ was deposited, thus demonstrating the solubility of $C_2H_5AlNH$. The insoluble portion, 0.9 g was saved for use as described below.

A 0.77 g a portion of the insoluble fraction of $C_2H_5AlNH$ was suspended in 70 mL of cyclohexane and the mixture was boiled 2.5 hr. A portion of $C_2H_5AlNH$ did not dissolve. The insoluble fraction, 0.54 g, was separated by centrifugation. The supernatant was brought to the boiling point and cyclohexane was distilled. After removal of 10 mL of cyclohexane, a portion of the mixture of $C_2H_5AlNH$ in cyclohexane was withdrawn and subjected to transmission election microscopy. Upon evaporation of cyclohexane and examination of microscopy, it was found that $C_2H_5AlNH$ was present partly as spherical particles, most of which were 0.14 to 0.30 $\mu$m in diameter. This mixture can be converted to aluminum nitride with corresponding retention of spherical morphology by the procedure described in Example 2.

EXAMPLE 5

One Step Preparation of Spherical Particles of AlN Precursor $(C_2H_5)_2AlNH_2$ (0.5 g), 2.5 g of moist ammonia (estimated to contain above 0.1 g and up to about (0.05 of water) were placed in a metal reaction vessel of about 10 mL volume. The contents were heated at about 135° C. for one our and at 150° C. for about two hours. The vessel was cooled to room temperature and opened in a dry box in an atmosphere of nitrogen. The recovered dry white powder weighted about 0.180 g. Examination of the powder by electron microscopy showed the presence of spherical particles.

The spherical particles, about 0.156 g, were placed in a quartz tube. The tube was evacuated and heated to about 900° C. for about 45 minutes. Subsequently, the sample was heated under nitrogen at about 1700° C. for about 30 minutes in a carbon tube. The tube was cooled and the contents examined by electron microscopy and X-ray diffraction. The analysis showed the presence of dense spherical particles of aluminum nitride.

The embodiments of the invention in which an exclusive property of privilege is claimed are defined as follows:

1. A method for making spherical particles of RAlNH comprising dissolving RAlNH in a liquid medium and precipitating it by removing part of the liquid medium, wherein R is selected from at least one member of the group $C_xH_{2x+1}$, where x is 1 to 20.

2. A method for making spherical particles of aluminum nitride comprising heating the particles of RAlNH made by the method comprising dissolving RAlNH in a liquid medium and precipitating it by removing part of the liquid medium, wherein R is selected from at least one member of the group $C_xH_{2x+1}$, where x is 1 to 20, in the presence of a nitrogen-containing compound selected from ammonia and hydrazine.

3. A method for making spherical particles of aluminum nitride comprising heating the particles of RAlNH made by the method comprising dissolving RAlNH in a liquid medium and precipitating it by removing part of the liquid 4. Flakes of aluminum nitride of approximately 1 μm thickness.

5. Flakes according to claim 4 of substantially theoretical density of aluminum nitride.

6. A densified material comprising the flakes of claim 4.

7. A densified material made by compacting the flakes of claim 4.

8. An electronic device comprising the flakes of claim 4.

9. An electronic device comprising flakes of claim 4 in compacted form.

* * * * *